(12) United States Patent
Lautenschläger

(10) Patent No.: US 7,389,564 B2
(45) Date of Patent: Jun. 24, 2008

(54) ARRANGEMENT FOR FIXING FURNITURE FITTINGS TO FRAME PROFILES OF PLATE-TYPE OR BOARD TYPE FURNITURE ELEMENTS

(75) Inventor: Gerhard Wilhelm Lautenschläger, Brensbach (DE)

(73) Assignee: Mepla-Werke Lautenschlager GmbH & Co., KG, Reinheim (DE)

( * ) Notice: Subject to any disclaimer, the term of this patent is extended or adjusted under 35 U.S.C. 154(b) by 0 days.

(21) Appl. No.: 10/485,589

(22) PCT Filed: Feb. 24, 2003

(86) PCT No.: PCT/EP03/01835

§ 371 (c)(1),
(2), (4) Date: Feb. 2, 2004

(87) PCT Pub. No.: WO03/080975

PCT Pub. Date: Oct. 2, 2003

(65) Prior Publication Data

US 2005/0013660 A1 Jan. 20, 2005

(30) Foreign Application Priority Data

Mar. 22, 2002 (DE) .............................. 202 04 618 U

(51) Int. Cl.
*E05D 5/00* (2006.01)
*B25G 3/00* (2006.01)

(52) U.S. Cl. ........................... 16/382; 16/383; 403/252; 403/255

(58) Field of Classification Search ................. 403/252, 403/255; 16/382, 383; 312/111, 140
See application file for complete search history.

(56) References Cited

U.S. PATENT DOCUMENTS 6,059,322 A * 5/2000 Nagai et al. ................. 403/255

FOREIGN PATENT DOCUMENTS

| DE | 12 50 687 B | * | 9/1967 |
| DE | 201 07 525 U1 | * | 8/2001 |
| DE | 20107525 U1 | * | 8/2001 |
| EP | 164479 A1 | * | 12/1985 |
| EP | 1 048 816 A | * | 11/2000 |
| FR | 1 535 094 A | * | 8/1968 |

* cited by examiner

*Primary Examiner*—Robert J Sandy
*Assistant Examiner*—Victor MacArthur
(74) *Attorney, Agent, or Firm*—Christa Hildebrand; Norris McLaughlin & Marcus, PA

(57) ABSTRACT

A furniture fitting including frame sections which are preferably extruded and are intended to enclose furniture parts in the form of plates or panels, wherein the flame sections have an open groove extending in the longitudinal direction receive and retain a retaining part of the fitting. The groove is narrowed by two shoulders which are parallel to one another with end faces facing one another, wherein the retaining part has a flange portion which can be supported on the free upper face of the shoulders and in which there is provided at least one bore for rotatably retaining the shank, which engages in the groove, of a clamping element which selectively fixes the retaining part on the frame section or releases it for disassembly or longitudinal displacement in the longitudinal direction of the groove.

9 Claims, 4 Drawing Sheets

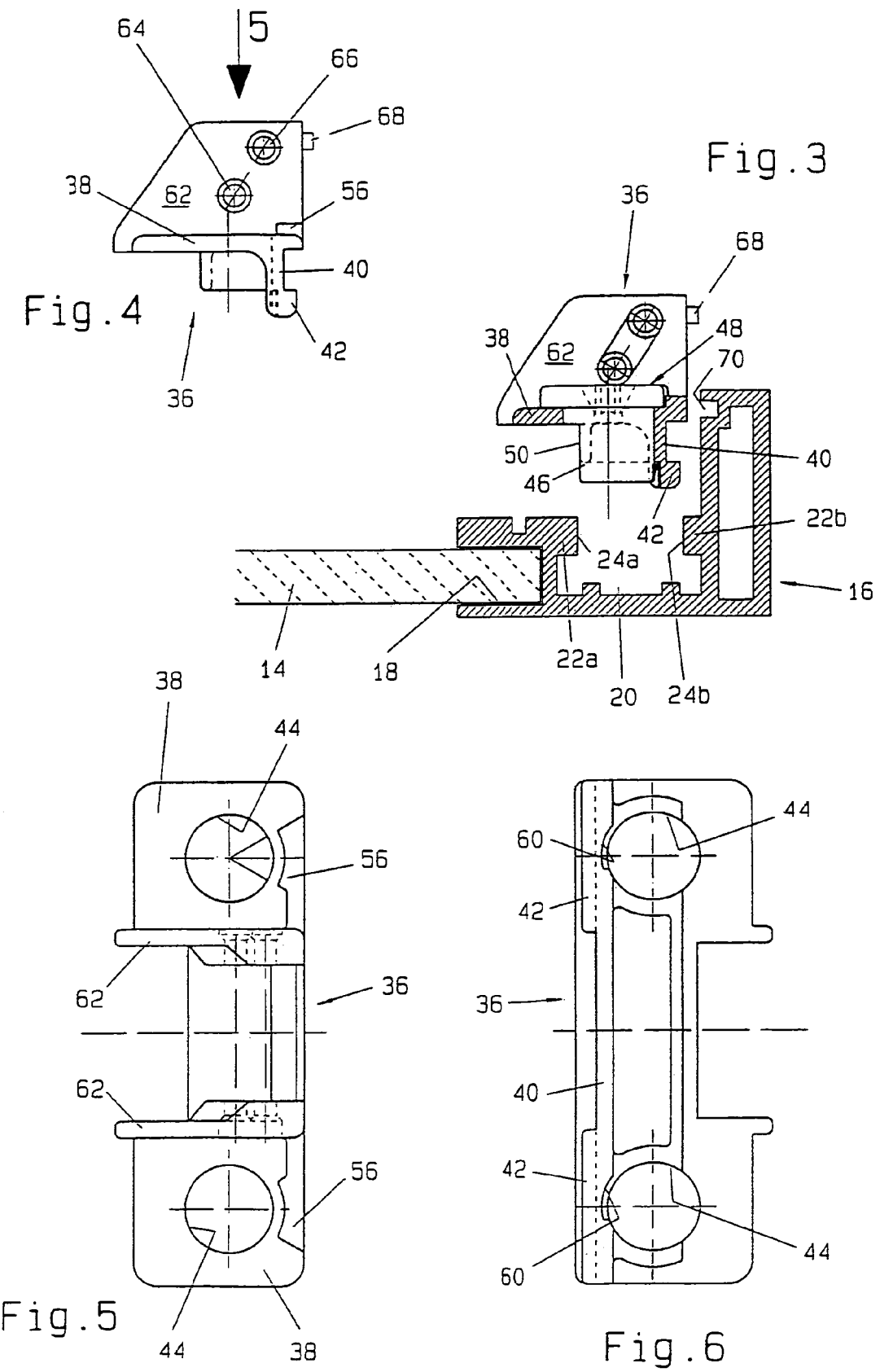

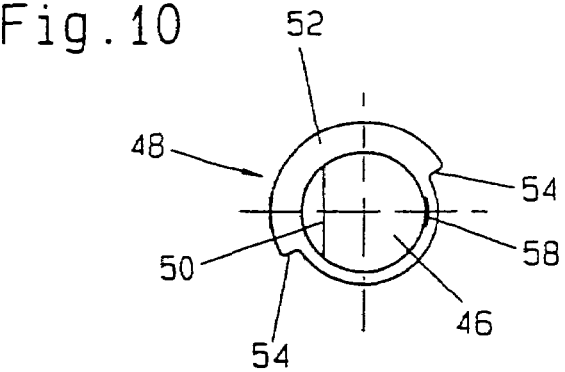
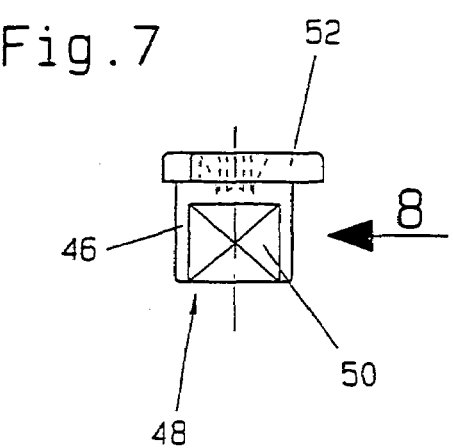
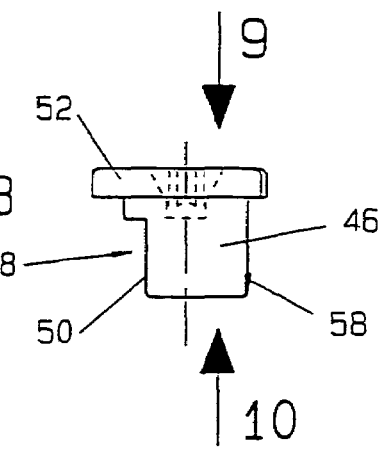
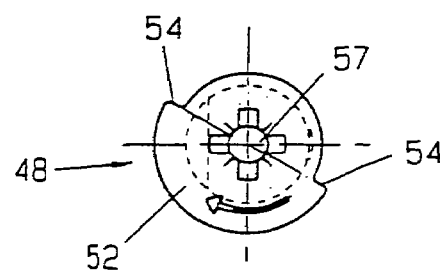

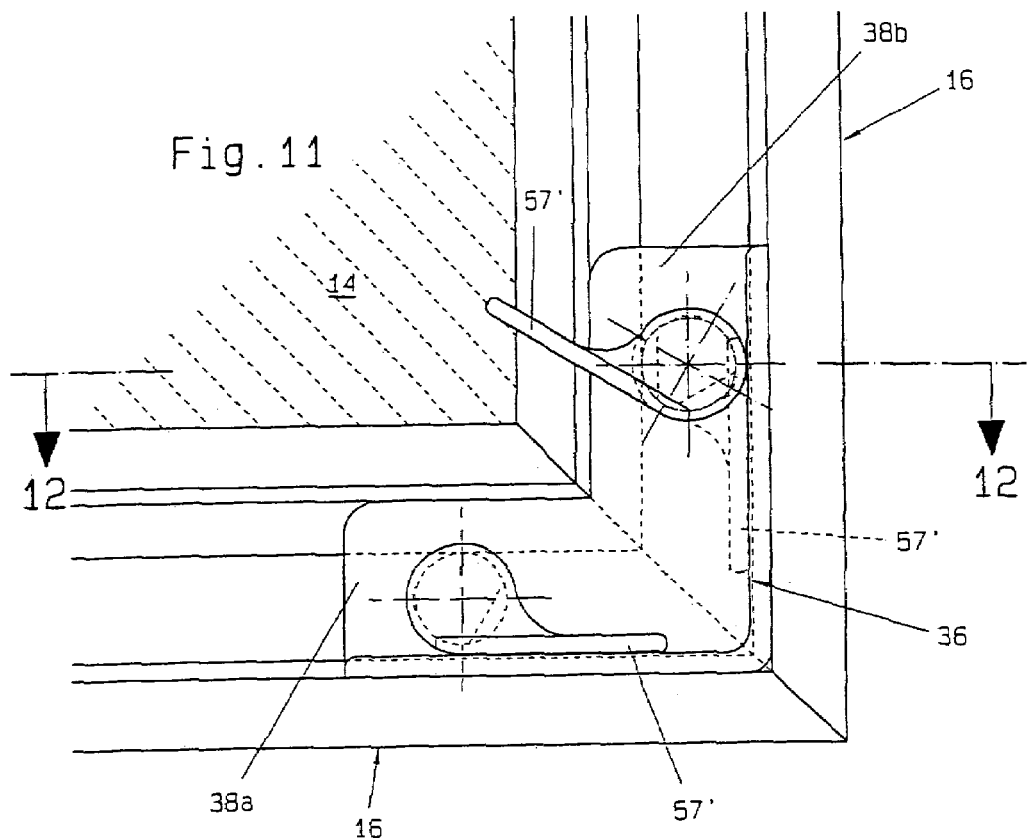
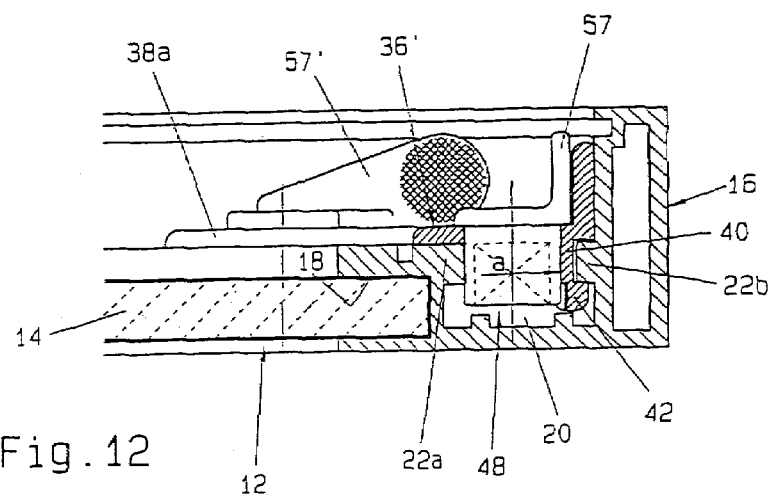

ARRANGEMENT FOR FIXING FURNITURE FITTINGS TO FRAME PROFILES OF PLATE-TYPE OR BOARD TYPE FURNITURE ELEMENTS

BACKGROUND OF THE INVENTION

The invention relates to an arrangement for fixing furniture fittings on frame sections which are preferably extruded and are intended to enclose furniture parts in the form of plates or panels, wherein the said frame sections have an open groove extending in the longitudinal direction of the section and provided to receive and retain a retaining part of the fitting to be fixed, the internal width of the said groove being narrowed in the region of its opening by two shoulders which are parallel to one another with end faces facing one another, wherein the retaining part has a flange portion which can be supported on the free upper face of the shoulders and in which there is provided at least one bore for rotatably retaining the shank, which engages in the groove, of a clamping element which selectively fixes the retaining part on the frame section or releases it for disassembly or longitudinal displacement in the longitudinal direction of the groove.

Frame sections extruded from metal or also alternatively extruded from plastics material have been used increasingly in recent years in furniture construction for enclosing furniture parts in the form of plates or panels, for example glass door leaves, which in the past were enclosed in wooden strips. Whereas in the case of such door leaves or flaps enclosed by a wooden frame the pivotable articulation on a cupboard carcass could be achieved with the known furniture hinges, in which the door leaf fixing part was constructed in the usual way as an insert cup which can be inserted into a matching recess in the rear face of the frame, in the case of the aforementioned extruded frame sections the use of normal hinges is not possible because the space available and the material thickness of these frame sections does not allow the installation of the usual hinge cups.

Therefore for-fixing fitting parts and also hinges on the frame sections of the aforementioned type which are under consideration here fixing arrangements have been developed (DE 201 07 525 U1) in which the door leaf fixing part of a hinge can be locked in a groove with a narrow mouth provided on the inside of the frame section, whereby a retaining part which can be fixed by a clamping element in the groove of the frame element can be used instead of the usual hinge cup.

The object of the invention is simplify the construction of this known arrangement for fixing fittings, particularly hinges, on frame elements, whereby the fixing of the retaining part on the frame element and the selective disassembly or adjustment of the retaining part in the longitudinal direction of the groove of the frame section is functionally improved and the security against inadvertent loosening and adjustment is increased.

SUMMARY OF THE INVENTION

Starting from a fixing arrangement of the type mentioned in the introduction, this object is achieved according to the invention in that the retaining part has in the region of the bore(s) provided by the shank of the clamping element in each case a strip-like projection which projects from the underside of the flange portion and has on its lower free end a locking tab which projects at right angles and can be inserted below the shoulders into the interior of the groove which is widened there, whereby the distance between the underside of the flange portion of the retaining part and the boundary surface of the locking tab which faces it is substantially equal to the distance between the upper and lower boundary surface of the associated shoulder which narrows the groove; that the shank of the clamping element which is rotatably mounted in the associated bore in the flange portion of the retaining part is of such a diameter that the distance measured above the locking tab between the outer face of the strip-like projection and the free outer face of the shank in the portion lying between the shoulders is substantially equal to the distance measured between the end faces of the shoulders which narrow the groove; and that in the region lying between the end faces of the shoulders in the proper fixing position the shank is provided with a flat area which reduces the shank diameter in the flattened region by at least the dimension by which the locking tab projects from the strip-like projection. By this configuration the regaining part is fixed positively in the groove by means of the strip-like projection integrally joined to its flange with the locking projection, whereby depending upon the rotary position the clamping element enables the insertion of the strip-like projection into the groove and then by rotation shifts the locking projection under one of the shoulders of the frame profile which are associated with one another and fixes it in this locking position. Thus the locking force exerted by the shank of the clamping element acts exclusively parallel to the furniture part in the form of a plate or panel which is enclosed by the frame section, for example in the horizontal direction parallel to the flat sides of a pane of glass enclosed by frame sections of the type under consideration here.

In this case it is provided that the clamping element is provided on its outer end with a disc-shaped head portion which has an increased diameter relative to the diameter of the bore in the flange of the retaining part and which in the proper fixing position of the retaining part is supported on the upper face of the flange of the retaining part.

The radius of the head portion of the clamping element is then advantageously reduced over a predetermined angular range in the circumferential direction to a dimension between the radius of the shank and the maximum radius of the head portion, whereby in the region of the bore(s) receiving the shank of the respective clamping element projections are provided which project from the upper face of the flange portion of the retaining part and on which the transition surfaces between the portions of larger and smaller radius of the disc-shaped head portion can be brought into abutment as the clamping element rotates. Thus in combination with the aforementioned transition surfaces these projections form stops which define the path of rotation of the clamping element from the insertion of the retaining part into the groove to the proper clamping position.

In the outer end face of the clamping element there is then advantageously provided in each case a recess which enables the application of a turning tool, for example a cross-slot recess, into which can be inserted a turning tool, in the aforementioned special case a Phillips screwdriver, with which the clamping element can be rotated.

Alternatively it may be advantageous if an integral handle—e.g. in the form of a projecting lever arm, a knurled knob, etc.—is provided on the outer free end of the clamping element instead of a recess for application of a tool. The rotation of the clamping element and thus the locking of the fitting part in the frame section can then be carried out manually without a tool.

In order to prevent the clamping element which is mounted in the appertaining bore in the retaining part from coming out of the bore inadvertently in the unfixed loose rotary position and then being lost, in a further development of the invention it is provided that in the region of the end of the shank of the clamping element which in the proper fixing position lies within the groove of the frame section a low projection is provided which projects radially from the circumferential surface of the shank and with which is associated a curved low recess in the boundary wall of the strip-shaped projection of the retaining part facing the shank. In this case this projection is advantageously provided in the region of the circumferential surface of the clamping element lying diametrically opposite the flat area of the shank, since in the rotated position of the clamping element it lies in the curved recess when the flat area of the shank is rotated into the position which enables the insertion into the groove of the frame section. Thus the clamping element is then secured against coming out of the bore.

When the fitting to be fixed on the frame section is a furniture hinge, then the configuration is such that a pair of walls which are spaced from one another projects at right angles from the upper face of the flange portion of the retaining part lying opposite the strip-like projection, and between these walls the wing-like end of at least one linkage part of the furniture hinge is in each case pivotably mounted on a bearing lug retained in bores in the walls.

In this case a configuration can be realized in which the ends on the door leaf side of two hinge linkages or arms of a multi-linkage hinge are pivotably mounted between the walls of the retaining part, the other ends thereof being in each case articulated on a hinge arm which can be fixed on the supporting wall of the carcass of a piece of furniture.

In an advantageous further development of the invention a projection can be provided in each case spaced above the flange portion on the walls projecting from the flange, whereby the said projection can be inserted into a groove or recess in the frame section which has a shape corresponding to the cross-section of the projection. In the proper fixing position of the retaining part the projections provided on the walls then effect an additional locking of the retaining part in the groove of the frame section.

The invention is explained in greater detail in the following description of an embodiment in conjunction with the drawings, in which:

BRIEF DESCRIPTION OF THE DRAWINGS

FIG. 3 shows a view corresponding to the section line in FIG. 1 through the frame section placed on the edge of the glass door leaf and the appertaining retaining part with the inserted clamping element in a raised position of the retaining part which is not yet inserted into the groove of the frame section;

FIG. 4 shows a side view of the retaining part without inserted clamping element(s);

FIG. 5 shows a plan view of the retaining part viewed in the direction of the arrow 5 in FIG. 4;

FIG. 6 shows a view of the retaining part from below;

FIG. 7 shows a front view of the clamping element which fixes the retaining part in the groove of the frame section;

FIG. 8 shows a view of the clamping element, viewed in the direction of the arrow 8 in FIG. 7;

FIG. 9 shows a plan view of the clamping element, viewed in the direction of the arrow 9 in FIG. 8;

FIG. 10 shows a view of the clamping element from below, viewed in the direction of the arrow 10 in FIG. 8;

FIG. 11 shows a plan view of the corner region of a glass door leaf enclosed by the frame section, in which two frame sections meeting at right angles are connected by a fitting constructed as a corner connection; and FIG. 12 shows a sectional view viewed in the direction of the arrows 12-12 in FIG. 11.

DETAILED DESCRIPTION OF THE PREFERRED EMBODIMENT

Figure 1:
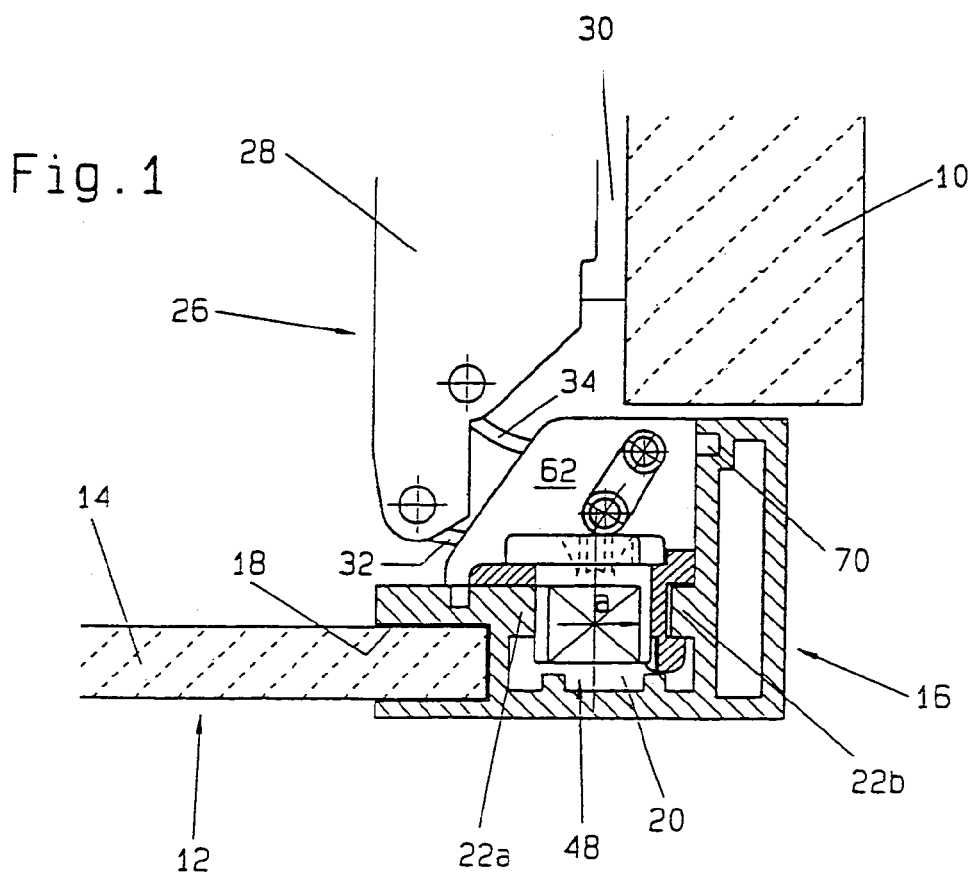
FIG. 1 shows a sectional view through a four-linkage hinge fixed on a frame section forming the enclosure for a glass door leaf, in which of the carcass fixing part of the said hinge constructed as an elongate bracket only the end region on the door leaf side is shown, the section line being placed at right angles to the longitudinal extent of the frame section and centrally through a bore provided in the flange portion of the retaining part and receiving the clamping element for fixing the retaining part on the frame section.

FIG. 1 shows the front end region of the side or carcass wall 10 of a cupboard carcass, of which the open front face can be closed by a door leaf 12 formed by a pane of glass 14 enclosed by a frame. The frame which encloses the pane of glass 12 is formed from extruded metal, e.g. a suitable aluminum alloy, or by extruded frame sections 16 made from plastics material.

Figure 2:
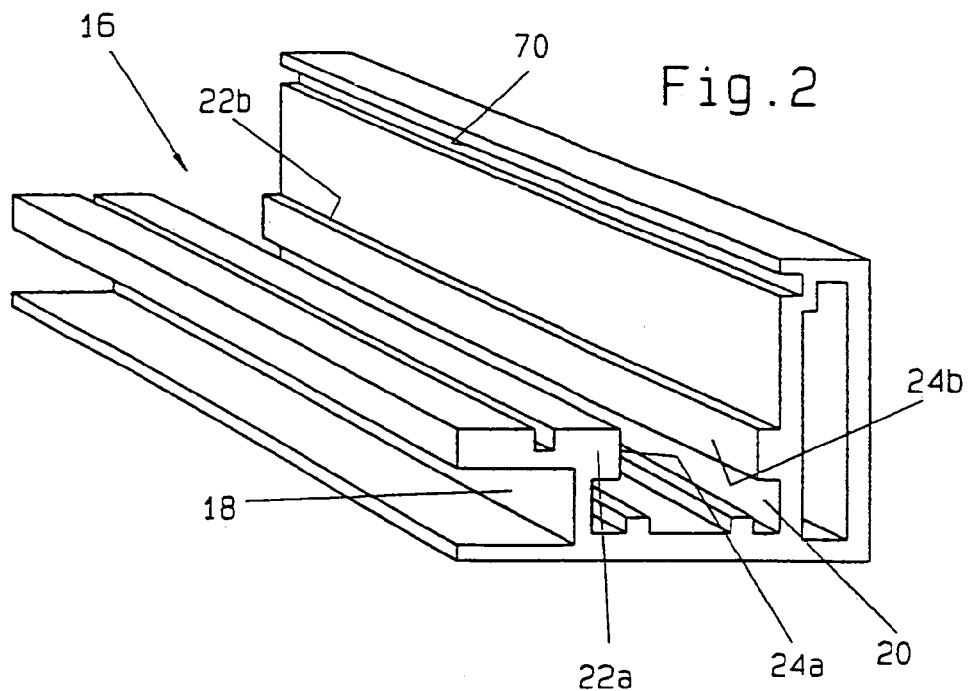
FIG. 2 shows a perspective view of a portion of the frame section used in FIG. 1 to enclose the glass door leaf.

A portion of the frame section 16 forming the frame of the door leaf 12 is shown in perspective view in FIG. 2.

It can be seen that this frame section 16 basically has the cross-section of an angle section with two angle arms extending at right angles to one another, and in the arm which is shown as horizontal a receptacle 18 is provided which receives the edge region of the pane of glass 14 of the door leaf 12.

Next an open groove is formed in this arm, the opening region of this groove being narrowed in its internal width by two shoulders 22a, 22b which are parallel to one another and have end faces 24a, 24b facing one another.

The shoulder 22b projects from the inner face of the vertical arm of the frame section 16 shown in FIGS. 1 and 2.

The door leaf 12 is fixed on the carcass wall 10 by way of hinges 26, of which only one hinge constructed as a four-linkage hinge is shown in FIG. 1. The supporting wall fixing part of this hinge is constructed in the usual way as an elongate bracket 28 which is fixed adjustably on a mounting plate 30 fixed on the inner face of the carcass wall 10. By way of two hinge linkages 32, 34 pivotably articulated on the front end of the bracket 28, the bracket 28 is pivotably connected to a door leaf fixing part—denoted henceforth as a retaining part 36—which therefore in practice replaces the hinge cup which is provided in the known hinges and can be countersunk into a recess in the rear face of a door leaf.

The retaining part 36 which is illustrated separately in FIGS. 4 to 6 has a substantially planar flange portion 38 which can be placed on the inner face of the frame section 16 in the region of the groove 20. A strip-like projection 40, which has a locking tab 42 projecting at right angles on its lower free end, projects in each case from the underside of the flange portion 38. The projection 40 with the locking tab 42 can be introduced through the open upper face of the groove 20 of the frame section, whereby the flange portion 38 then rests on the side faces of the shoulders 22a, 22b which point upwards in the drawings. Bores which are spaced from one another in the longitudinal direction and in which the shank 46 of a clamping element 48 (FIGS. 7 to 10) is rotatably mounted are provided in the outer end region of the flange portion 38. It can be seen that the clear distance between the underside of the flange portion 38 and the upper boundary surface of the locking tab 42 is chosen to correspond to the width of the end face 24b of the shoulder 22b, so that after the flange portion 38 rests on the inner face of the horizontal arm of the frame section 16 the retaining part inserted into the groove. 20 can then be pushed to the right in the direction of the arrow a in FIG. 1 in such a way that the locking tab 42 engages below the shoulder 22b. The clamping element 48 rotatably mounted in the bores 44 is provided in order to fix the retaining part 36 in this locking position, the shank 46 being provided with a flat area 50 for this purpose. FIG. 3 shows the rotated position for insertion of the clamping element in which the flat area 50 is in a position where it points to the end face 24a of the shoulder 22a. It can be seen that the width of the groove 22 in the narrowed opening region is adapted to the dimension measured over the outwardly directed end face of the locking tab and the circumference of the shank 46 of the clamping element 48 so that the parts projecting from the underside of the flange portion 38 of the retaining part can be introduced precisely into the groove. With a subsequent rotation of the clamping element 48 the position of the flat area changes accordingly and the cylindrical outer circumferential surface of the shank 46 comes to rest on the end face 24a of the shoulder 22a. In this way the retaining part 36 as a bore is moved into the locking position shown in FIG. 1 and fixed in this position. In order to release the retaining part it is then necessary to rotate the clamping element 48 back in such a way that the flat area 50 on the shank 46 again points to the end face 24a of the shoulder 22a.

The clamping element 48 is provided on its outer end with a disc-shaped head portion 52 which has an increased diameter relative to the diameter of the bore 44 and which in the proper fixing position of the retaining part 36 rests on the upper face of the flange portion 38. It can be seen especially in FIGS. 9 and 10 that the disc-shaped head portion 52 has two regions with different radii, so that between these two regions transition surfaces 54 are formed which in co-operation with projections 56 projecting upwards from the flange portion 38 form stops which delimit the possible rotation of the clamping element to an angle which is just sufficient in order to rotate the shank 46 out of the position aligned with the end face 24a into a position in which the circumferential wall of the shank 46 adjoining the flat area 50 rests on the end face 24a. For the rotation of the clamping element 48 a cross-slot 57 into which the actuating end of the shank of a Phillips screwdriver can be inserted is provided in the upwardly directed free end face of the disc-shaped head portion 52 of the clamping element 48.

It can also be seen in FIGS. 8 and 10 that in the free end region of the shank 46 of the clamping element 48 in the region of the circumferential surface of the shank 46 opposite the flat area 50 a low radial 58 projection is provided with which are associated curved low recesses 60 in the boundary wall of the strip-shaped projection 40 facing the shank 46. In the insertion position of the clamping element 48 into the bores. 44 the projection 58 engages in the recess 60 and thereby secures the clamping element against withdrawal from the bore 44.

Two walls 62 which are spaced from one another project from the flange portion at right angles to the longitudinal direction of the groove, and between these walls the wing-like ends of the hinge linkages 32, 34 are in each case guided and pivotably mounted there on bearing lugs, the ends of which are retained in bores 64, 66 in the walls 62.

In FIGS. 3 and 4, on the vertical boundary surfaces of the walls 62 lying on the right in each case short projections 68 which can be additionally provided are indicated which in the proper locking position of the retaining part 36 in the groove 20 engage in a groove 70 in the facing inner face of the frame part and thus effect additional locking of the retaining part in the disassembly direction.

In FIGS. 11 and 12 an embodiment of the fixing arrangement according to the invention is shown in which the fitting to be fixed is not a linkage hinge of the type described above which enables the pivoting of a door leaf 12 but a corner connector 36' with which two frame sections 16 which meet at right angles can be releasably connected to one another in a miter joint.

The flange portion 38 of the previously described embodiment is composed here of two flange elements 38a, 38b which are connected integrally to one another and extend at right angles to one another, and which in each case are provided with a strip-like projection 40 projecting from the underside thereof and a locking tab 42 which—corresponding to the flange elements 38a, 38b—extend at right angles to one another. The shank of at least one clamping element 48 of the type already described is rotatably mounted in each of the flange elements, but instead of the recess 57 for application of a tool a lever arm 57' is provided which projects radially from the end face of the clamping element and enables the rotation of the clamping elements 48 manually without a tool.

It can be seen that modifications and variants of the described embodiments of the fixing arrangement according to the invention can be realized within the scope of the idea of the invention. Instead of being constructed as a linkage hinge or as a corner connector for two frame sections to be connected at right angles, the fitting can also be constructed as a fitting for connection of furniture parts which meet at right angles, one of which is provided with a frame section of the type under consideration here. Also its use as a compartment base support which can be adjusted gradually in the longitudinal direction of the groove is readily conceivable. All that is essential to the invention is that a retaining part which can be loosely inserted into the groove 20 with the narrowed opening region can be moved by a clamping element rotatably mounted in it into a locking position in which the retaining part is locked positively without play in the groove.

The invention claimed is:

1. A furniture fitting, comprising
a retaining pail (36),
a clamping element (48),
a frame section (16) having a groove (20) defined therein extending in a longitudinal direction, the frame section for receiving the retaining part (36), the groove (20) is narrowed by two parallel shoulders (22a, 22b), each shoulder having an end face (24a, 24b) facing one another,
the retaining part (36) has an integral flange portion (38) supported by the shoulders (22a, 22b), the retaining part (36) has a bore (44) defined therein for receiving the clamping element (48), the clamping element (48) having a shank (46) which extends into the groove (20) to releasably attach the retaining part (36) to the frame section (16), when released the retaining part (36) being longitudinally displaceable along the groove (20), and
wherein the retaining part (36) has adjacent to the bore (44) a strip-shaped projection (40) protruding substantially perpendicularly from a first surface of the flange portion (38) and a locking tab (42) extending into the groove (20), one of the shoulders (22a, 22b) being received between the first surface of the flange portion (38) and the locking tab (42),
and wherein the shank (46) is mounted so as to pivot in the bore (44) in the flange portion (38), the dimensions of the strip-shaped projection (40) and the shank (46) together as measured above the locking tab (42) is essentially equal to a distance between the end faces (24a, 24b) of the shoulders (22a, 22b), and wherein the shank (46) has, in an area defined between the end faces (24a, 24b) of the shoulders (22a, 22b), a flat surface (50) which reduces a diameter of the shank (46) by at least an amount by which the locking tab (42) protrudes from the strip-shaped projection (40) towards the one of the shoulders, and a pair of walls (62) offset from one another and extending substantially perpendicularly relative to a second surface of the flange portion (38) of the retaining part (36); between the walls (62) a wing-shaped end of at least one hinge linkage (32, 34) of a furniture hinge (26) is mounted so as to pivot on a bearing lug retained in at least one bore (64, 66) defined in the walls (62).

2. The furniture fitting according to claim 1, wherein the clamping element (48) includes a disc-shaped head portion (52) having an enlarged diameter relative to a diameter of the bore (44) defined in the flange portion (38) of the retaining part (36).

3. The furniture fitting according to claim 2, wherein the disc-shaped head portion (52) has two regions with different radii, a first region having a maximum radius and a second region having a reduced radius in a circumferential direction over a specified angle range an amount between a radius of the shank (46) and the maximum radius of the disc-shaped head portion (52), transitions surfaces (54) being formed between the regions of the maximum and the reduced radii of the disc-shaped head portion (52); and in an area of the bore (44) that receives the shank (46) of the clamping element (48), protrusions (56) are provided extending from a second surface, opposite that of the first surface, of the flange portion (38) of the retaining part (36); the transition surfaces (54) between the regions of the maximum and the minimum reduced radii of the disc-shaped head portion (52) contacting the protrusions (56) when the clamping element (48) is rotated.

4. The furniture fitting according to claim 1, wherein the clamping element (48) has a recess (57) defined in an end surface.

5. The furniture fitting according to claim 1, wherein a handle (57') is provided at an outer end of the clamping element (48).

6. The furniture fitting according to claim 1, wherein a radial projection (58) extends from a circumferential surface of the shank (46) disposed so as to be received within a curved recess (60) defined in the strip-shaped projection (40) of the retaining pail (36) facing the shank (46).

7. The furniture fitting according to claim 6, wherein the radial projection (58) is disposed in a circumferential area of the shank (46) of the clamping element (48) that is diametrically opposite the flat surface (50) of the shank (46).

8. The furniture fitting according to claim 1, wherein between the walls (62) of the retaining part (36), a first end of each of two hinge linkages (32, 34) of a multi-linkage hinge (26) are mounted so as to pivot, a second end opposite the first end of each of the two hinge linkages (32, 34) are articulated on a bracket (28) configured to attach to a bearing wall of a body of a piece of furniture.

9. The furniture fitting according to claim 1, further comprising a protuberance (68) extending from the flange portion (38) and disposed above the second surface of the flange portion (38) is received within a complementary shaped groove (70) defined in the frame section (16).

* * * * *

UNITED STATES PATENT AND TRADEMARK OFFICE
CERTIFICATE OF CORRECTION

PATENT NO. : 7,389,564 B2  Page 1 of 1
APPLICATION NO. : 10/485589
DATED : June 24, 2007
INVENTOR(S) : Lautenschläger It is certified that error appears in the above-identified patent and that said Letters Patent is hereby corrected as shown below:

Column 1, line 39, "for-fixing" should read -- for fixing --

Column 5, line 1, "groove. 20" should read -- groove 20 --

Column 5, line 52, "bores. 44" should read -- bores 44 --

Column 6, line 39, "a retaining pail (36)" should read -- a retaining part (36) --

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,389,564 B2
APPLICATION NO. : 10/485589
DATED : June 24, 2008
INVENTOR(S) : Lautenschläger It is certified that error appears in the above-identified patent and that said Letters Patent is hereby corrected as shown below:

Column 1, line 39, "for-fixing" should read -- for fixing --

Column 5, line 1, "groove. 20" should read -- groove 20 --

Column 5, line 52, "bores. 44" should read -- bores 44 --

Column 6, line 39, "a retaining pail (36)" should read -- a retaining part (36) --

This certificate supersedes the Certificate of Correction issued March 17, 2009.

Signed and Sealed this

Seventh Day of April, 2009

JOHN DOLL
*Acting Director of the United States Patent and Trademark Office*